(12) United States Patent
Böhle (10) Patent No.: US 6,719,877 B2
(45) Date of Patent: Apr. 13, 2004

(54) GLUING DEVICE FOR AUXILIARY DOOR SEALS

(76) Inventor: Hartmut Böhle, Zhgspitzstrasse 25, 82393 Iffeldorf (DE)

( * ) Notice: Subject to any disclaimer, the term of this patent is extended or adjusted under 35 U.S.C. 154(b) by 161 days.

(21) Appl. No.: 09/936,475

(22) PCT Filed: Jan. 18, 2001

(86) PCT No.: PCT/DE01/00194
§ 371 (c)(1),
(2), (4) Date: Sep. 13, 2001

(87) PCT Pub. No.: WO01/54825
PCT Pub. Date: Aug. 2, 2001

(65) Prior Publication Data
US 2002/0157783 A1 Oct. 31, 2002

(30) Foreign Application Priority Data
Jan. 26, 2000 (DE) .......................... 100 03 387

(51) Int. Cl.⁷ .............................................. B62D 65/08
(52) U.S. Cl. ................. 156/379.6; 156/379.8; 156/538; 156/578; 269/21; 269/56; 414/222.13
(58) Field of Search ............ 156/379.6, 379.8, 156/538, 574, 575, 578; 269/21, 55, 56, 905; 414/222.01, 222.13, 751.1; 277/922; 49/475.1

(56) References Cited

U.S. PATENT DOCUMENTS

| | | | |
|---|---|---|---|
| 4,026,598 A | * | 5/1977 | Koike ..................... 296/146.9 |
| 5,173,148 A | * | 12/1992 | Lisec ......................... 156/578 |
| 5,937,993 A | * | 8/1999 | Sheets et al. ............. 198/345.1 |
| 6,138,415 A | * | 10/2000 | Ohtsu et al. ............... 49/490.1 |
| 6,247,271 B1 | * | 6/2001 | Fioritto et al. ............. 49/490.1 |
| 6,416,273 B1 | * | 7/2002 | Herbermann et al. .... 414/751.1 |

FOREIGN PATENT DOCUMENTS

| | | |
|---|---|---|
| DE | 40104131 | 10/1991 |
| DE | 42209721 | 1/1993 |
| DE | 42340541 | 4/1994 |
| DE | 19800038 | 7/1999 |
| EP | 0234505 | 9/1987 |

* cited by examiner

Primary Examiner—Jeff H. Aftergut
Assistant Examiner—John T. Haran
(74) Attorney, Agent, or Firm—Greer, Burns & Crain, Ltd.

(57) ABSTRACT

The bonding system for auxiliary door seals contains a receiving means for detachably holding a mounting template whose peripheral edge at the narrow side is provided with a plurality of spaced-apart trough-like suction members which are connectable via a joint line and a connection valve to a source of vacuum to suck in the auxiliary door seal placed on the peripheral edge. The receiving means is guided together with the mounting template by a slide means below and past two plasma irradiation means and below two metering devices which apply a predetermined amount of a viscous adhesive to the auxiliary door seal. Each of the metering devices has a double seat valve which releases either the connection between a cartridge and a displacement-type metering means or the connection between the displacement-type metering means and the outlet opening of the valve means.

10 Claims, 7 Drawing Sheets

GLUING DEVICE FOR AUXILIARY DOOR SEALS

FIELD OF THE INVENTION

The present invention relates to gluing or bonding systems for door seals, and more particularly to systems for adhesively bonding door seals to door flanges of automobiles.

SUMMARY OF THE INVENTION

The present invention relates to a gluing system for auxiliary door seals which are to be adhesively bonded onto a door flange of an automotive vehicle. The gluing system serves to prepare the auxiliary door seal for the bonding operation proper by fixing a door seal by means of a vacuum onto a mounting template and by providing the door seal at both end sections with a viscous adhesive, in addition to the dry adhesive strip already placed on said seal, after the adhesive application portion has been activated by atmospheric plasma treatment.

It is the object of the present invention to provide a gluing system with which the above-mentioned working steps are automatically performed, and it should here be ensured that exactly determined small amounts of the adhesive are applied to the door seal at exactly observed places which have previously been subjected to plasma irradiation.

This object is achieved according to the invention by the features of patent claim 1.

Advantageous developments of the invention are characterized in the subclaims.

The bonding system according to the invention contains a receiving means for detachably holding a vacuum-type mounting template in which a plurality of spaced-apart trough-like suction members of a rubber-like material are arranged on a peripheral edge at the narrow side, the suction members being connectable via a joint line and a connection valve to a vacuum source of the bonding system. These suction members preferably suck an auxiliary door seal placed by hand on the peripheral edge, the seal being thereby fixed onto the mounting template. The mounting template further contains a relief valve which is connected to the line and by the actuation of which, preferably by pressing an actuation pin inwards, the vacuum is eliminated, so that the auxiliary door seal is released, which takes place in a subsequent working step, namely after the auxiliary door seal has been adhesively bonded to the door flange of an automotive vehicle.

The bonding system according to the invention further includes a slide means by which the receiving means with the mounting template clamped thereonto and the auxiliary door seal fixed thereto is passed below preferably two plasma irradiation means which irradiate the end portions of the auxiliary door seal which are intended for the application of a viscous adhesive, preferably a one-component adhesive. The slide means transports the mounting template with the auxiliary door seal onwards below two metering devices, each of which applies a predetermined amount of a viscous adhesive to the auxiliary door seals. The mounting template with the auxiliary door seal is lifted by a lifting means of the slide means to the outlet opening of the metering device. The resulting adhesive thread is torn off in a subsequent lowering step.

The slide means is preferably conveyed by its drive means at a constant speed from the initial position into the end position below the metering devices and back again. When the initial position has been reached again, the mounting template with the auxiliary door seal which is fixed thereto and provided with the activated adhesive is taken from the receiving means, whereupon the auxiliary door seal is adhesively bonded by means of the mounting template to the predetermined location of the door flange of an automotive vehicle and is released from the mounting template after the vacuum has been eliminated. The template is then again detachably fastened to the receiving means of the bonding system according to the invention, the vacuum unit which is in permanent operation being automatically connected to the suction members.

Since the area of the door flange to which the auxiliary door seal is adhesively bonded by means of the manually operated mounting template is not flat, but extends in slightly curved fashion, different mounting templates must be used for applying the auxiliary door seals to the left and right door of an automotive vehicle, and the peripheral edges of the mounting templates which receive the auxiliary door seal extend here in mirror-inverted fashion relative to each other. To handle both types of mounting templates in the inventive bonding system without the need for newly adjusting e.g. the slide means, it is suggested according to a further essential aspect of the invention that each mounting template should include a section which is positioned on a straight connection between the bonding points. With such a section the mounting template is mounted on the fastening means of the receiving means, e.g. in a clamping means.

With such a configuration the slide means transports the bonding points into the exactly predetermined position below the two metering devices in both types of mounting templates—for the left and right vehicle door, so that the preferably very small amount of adhesive which may e.g. be 0.01 $cm^3$ is exactly applied to the predetermined locations.

In a further development the mounting template may have a section which is the lower one in the installation position of the bonding system and extends in straight fashion over the entire length thereof and on which the curved upper section is located with the peripheral edge receiving the auxiliary door seal. The mounting template may here be made integral from a plastic material. The connection valve projects from the bottom side of the mounting template at an end section for connection to the source of vacuum, and the relief valve from the other end section.

It is not only indispensable that the auxiliary door seals must be provided with adhesive exactly at the predetermined places (which need not necessarily be located on the end sections of the auxiliary door seal and the number of which is of course not limited to two), but the adhesive must be applied in an exactly observed predetermined amount which is very small in the case of the auxiliary door seal.

To solve this problem, the invention suggests that each metering device provided in the bonding system should contain a cartridge including the adhesive, which is connectable via a valve means to a displacement-type metering means, and that the valve means should contain a double seat valve which releases either the connection between the cartridge and the displacement-type metering means or the connection between the displacement-type metering means and the valve outlet opening.

Furthermore, the cartridge is here preferably engaged by a pneumatic piston which generates the pressure required for transferring the adhesive into the displacement-type metering means, and the displacement-type metering means contains a pneumatic piston/cylinder unit whose piston is displacement-controlled, whereby an exactly defined amount of adhesive is ejected. The initial position of the piston in the cylinder is preferably adjustable.

In the metering device according to the invention, whenever the double seat valve thereof closes the valve outlet opening of the metering device, the interior of the cartridge communicates with the cylinder of the displacement-type metering device to always fill again the cylinder chamber before the piston returns into the initial position. When the double seat valve is moved into the lifted position in which the valve outlet opening is released, a preferably conical section of the valve needle closes a correspondingly shaped valve seat, thereby interrupting the connection between the cartridge and the displacement-type metering means, whereupon the pneumatic piston of the displacement-type metering means is pushed forwards up to its exactly predetermined end position and ejects the intended amount of adhesive.

The reciprocating valve needle preferably comprises a ball-shaped valve needle head which can cooperate with a correspondingly shaped valve seat to close the valve outlet opening. In the rear upper position, a conical section of the valve needle hits, as mentioned above, upon a correspondingly shaped valve seat.

The position of the pneumatic piston which is seated in the cartridge is expediently monitored, and when a minimum level is reached, it should be indicated that a new filled cartridge has to be inserted.

While the metering device of the invention has been described in connection with the bonding system of the invention, it should be noted that said metering device is suited not only for ejecting an adhesive, but for discharging generally low- to high-viscosity substances, such as fats or the like. Thus the metering device constitutes an independent invention which is particularly suited for the exact application of minimum amounts of a viscous substance.

BRIEF DESCRIPTION OF THE DRAWINGS

Further details of the invention will become apparent from the following description and the drawing, in which.

DETAILED DESCRIPTION OF THE INVENTION

Figure 1:
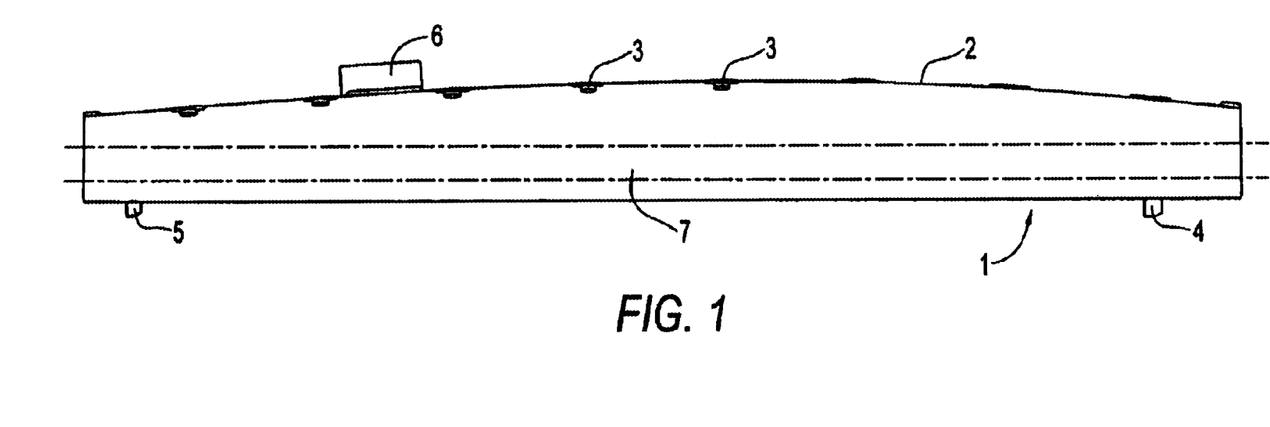
FIG. 1 is a side view of a mounting template.
Figure 2:
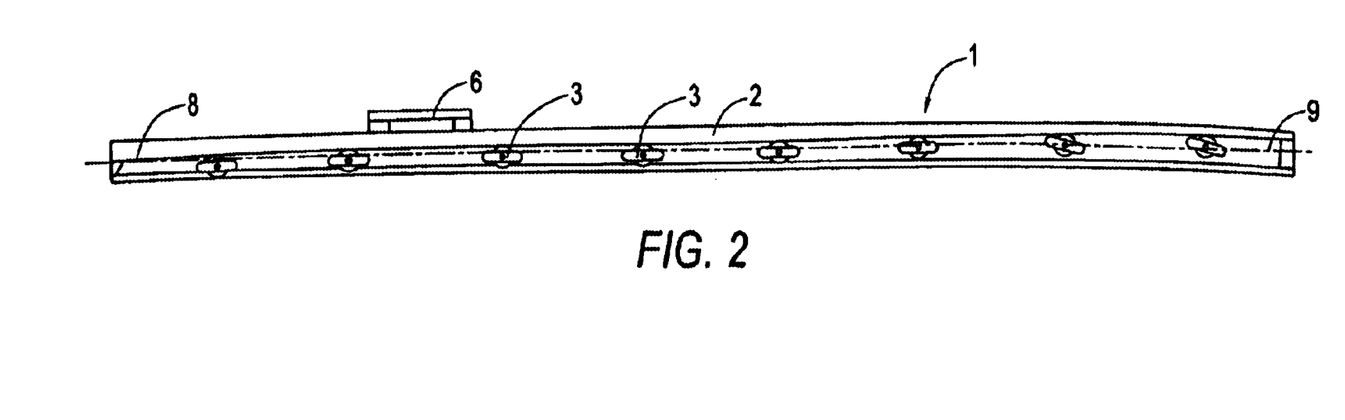
FIG. 2 is a top view on the mounting template according to FIG. 1.
Figure 3:
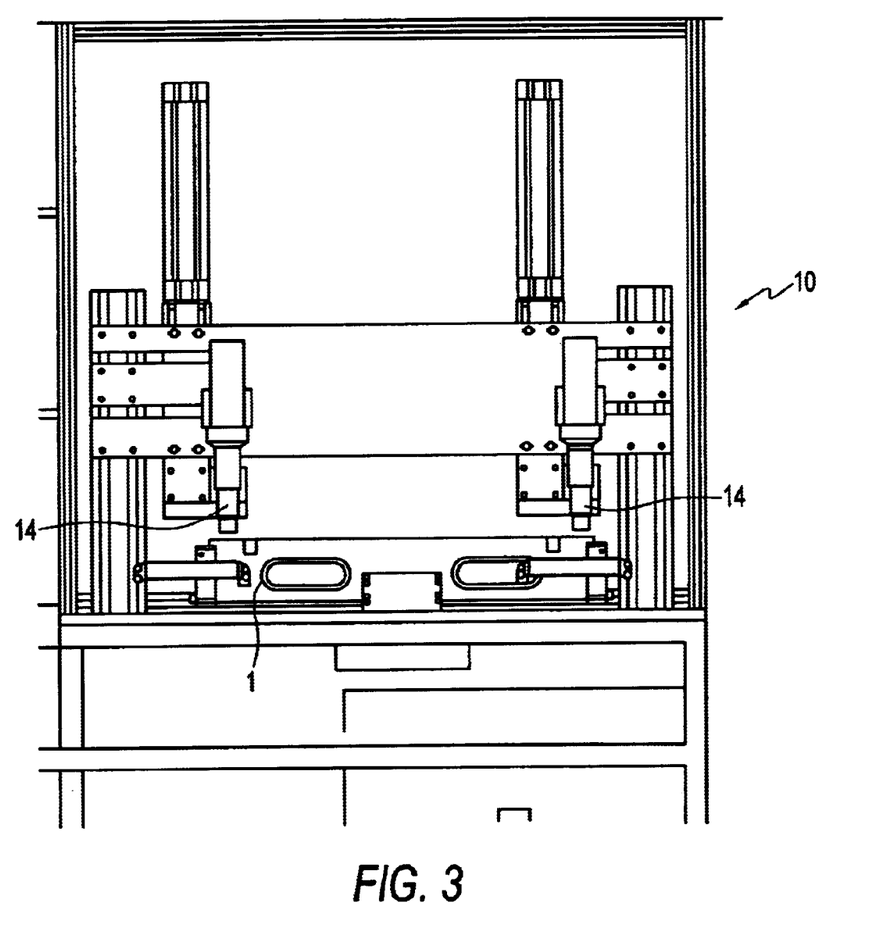
FIG. 3 is a front view of an embodiment of the bonding system.
Figure 4:
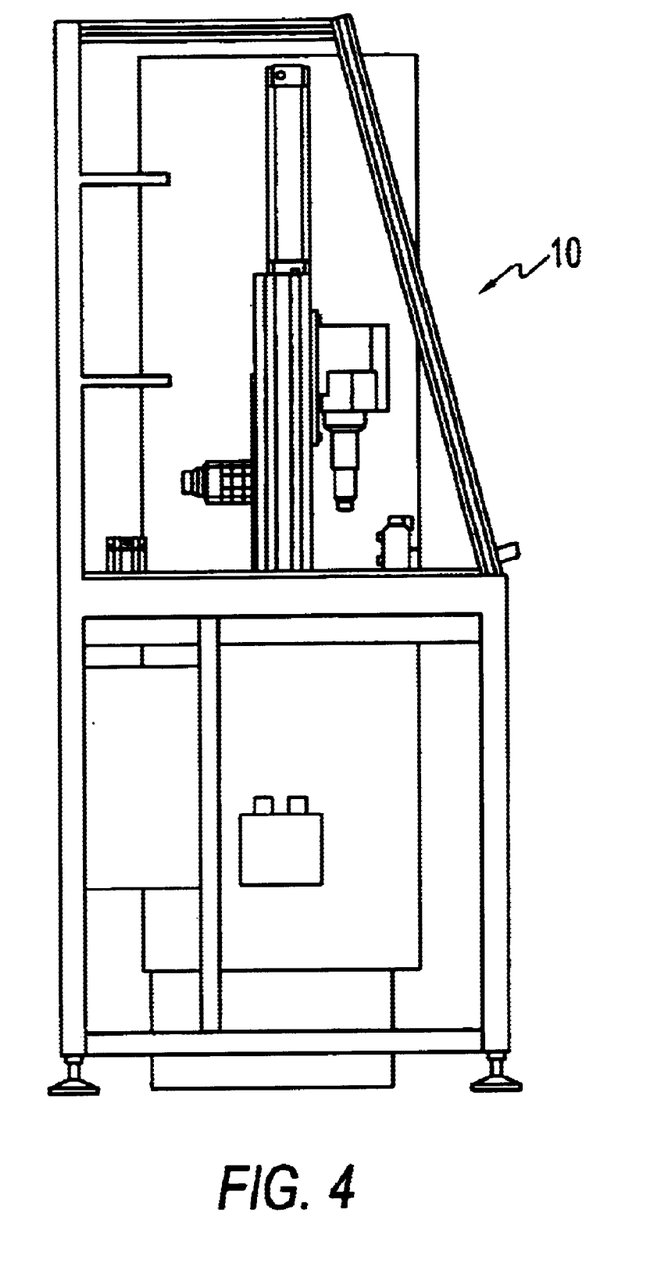
FIG. 4 is a side view of the bonding system.
Figure 5:
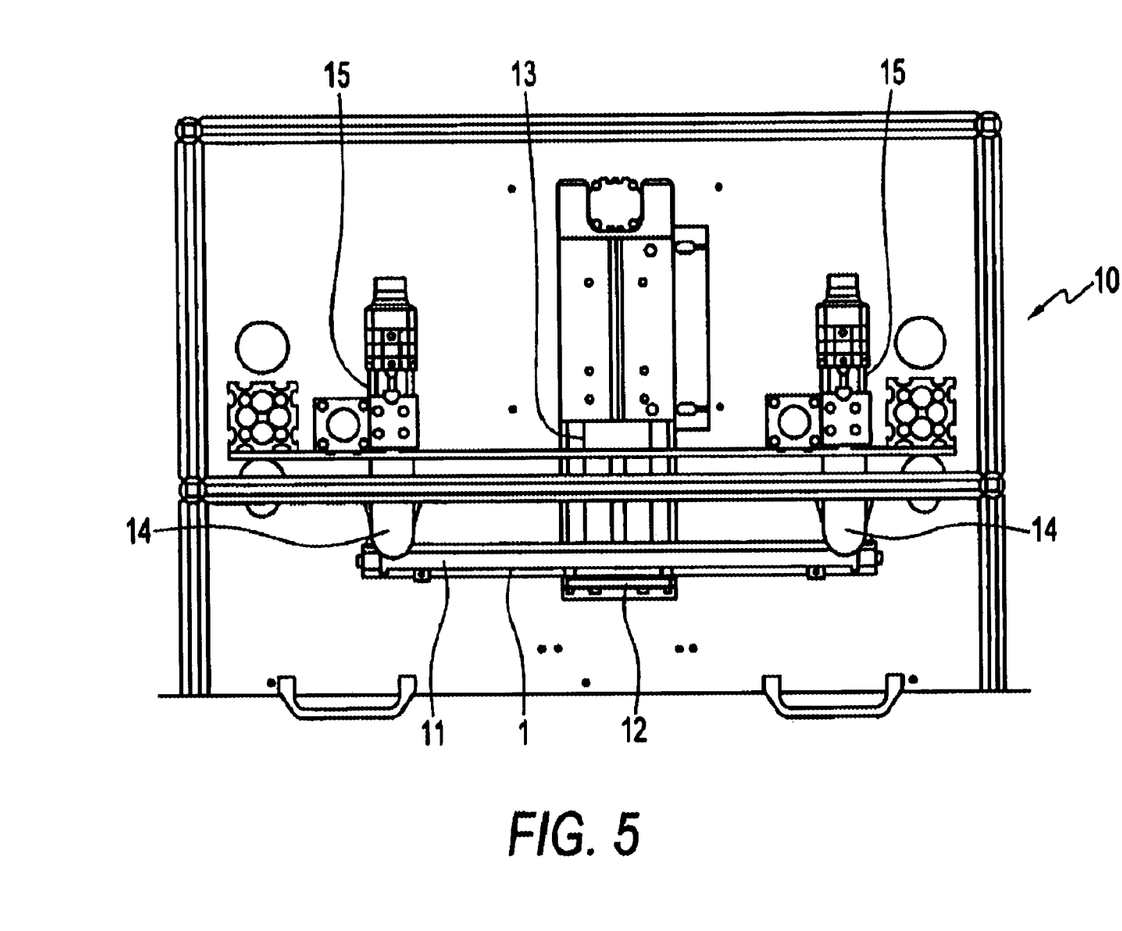
FIG. 5 is a top view on the bonding system.
Figure 6:
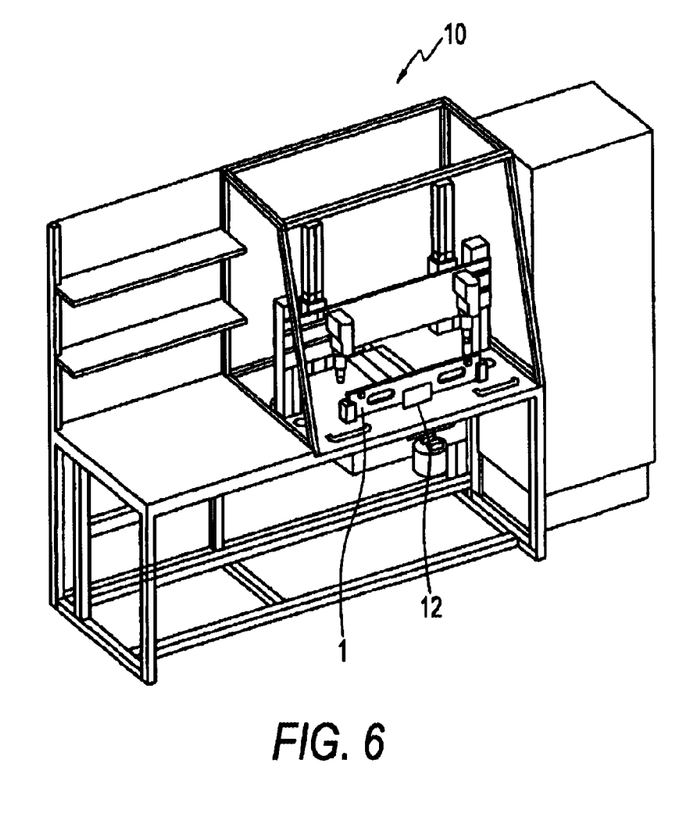
FIG. 6 is a perspective view of the bonding system.
Figure 7:
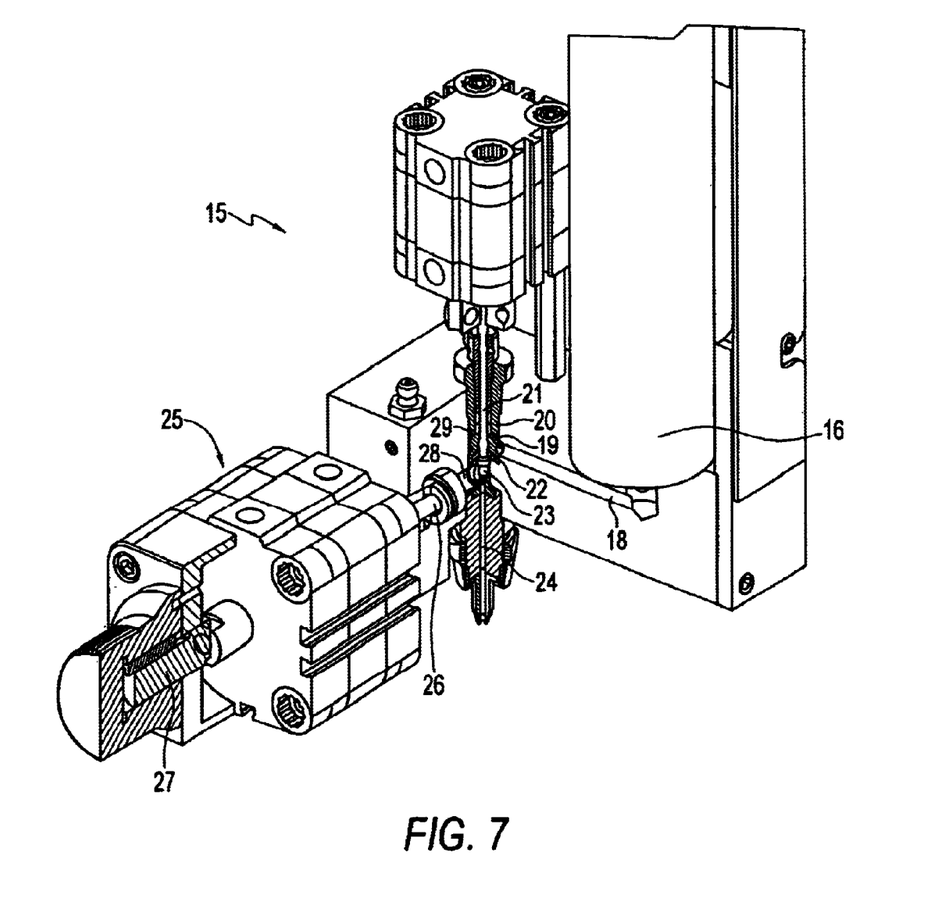
FIG. 7 is a partially cut perspective view of an embodiment of the metering device.
Figure 8:
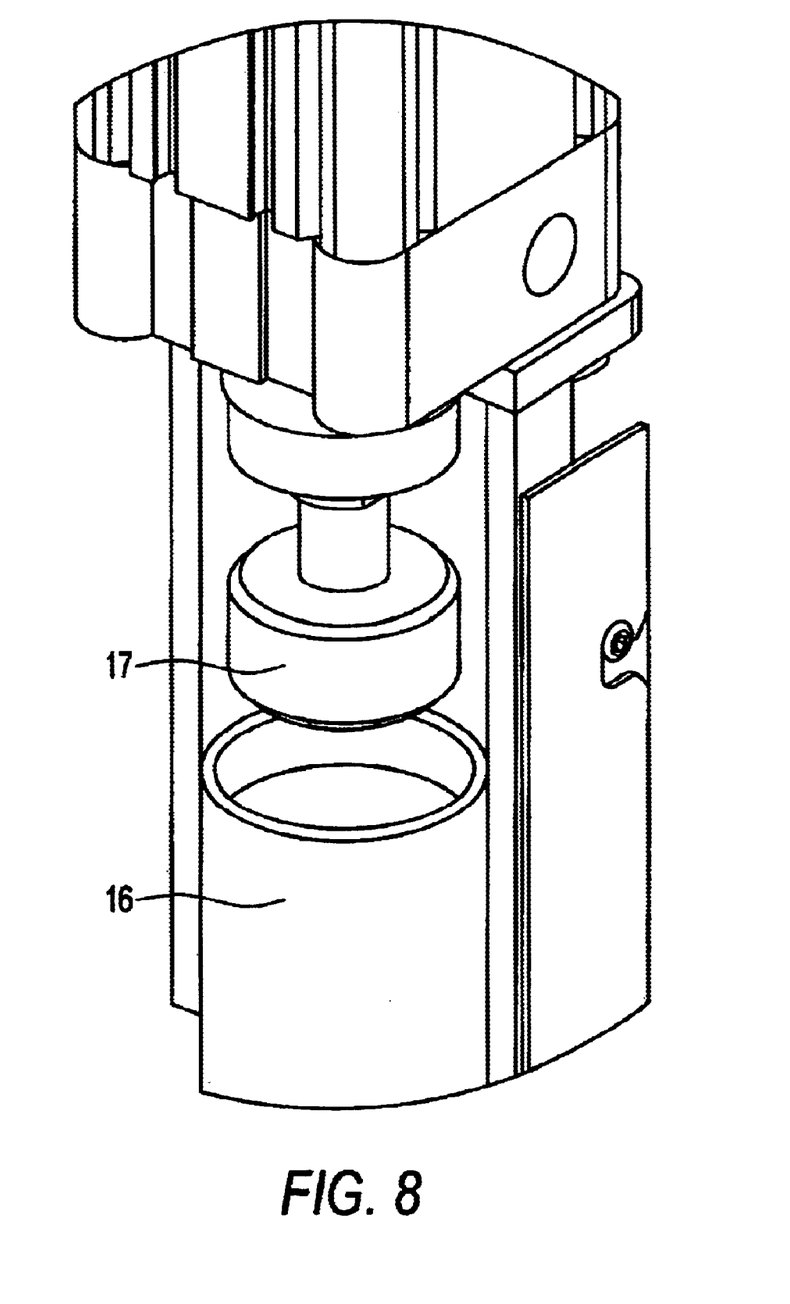
FIG. 8 is an exploded view showing a few details of the cartridge.

FIGS. 1 and 2 show a mounting template 1 which along its peripheral edge 2 (the upper one in the figures) includes eight spaced-apart trough-shaped suction members 3 of a rubber-like material that are connected to a line (not visible in the figures) which is positioned in a cavity extending along the length of the mounting template 1. At a lateral end, said line is provided with a connection valve 4 projecting from the bottom side of the mounting template 1, while the other lateral end of the line is provided with a relief valve 5 which also projects from the bottom side of the mounting template 1.

The peripheral edge 2 has placed thereon a strip-like auxiliary door seal (not shown in the figures) which is firmly sucked by the suction members 3 onto the peripheral edge 2 when the connection to a source of vacuum (not shown) has been established. The suction force is canceled again by pressing the pin of the relief valve 5 inwards.

The mounting template 1 is provided with a guide means 6 by which it can be positioned on a form template (not shown) in such a manner that the auxiliary door seal can be pressed exactly at the predetermined place onto a door frame. To this end the form template has previously been clamped onto the door frame.

As shown in FIG. 2, the peripheral edge 2 has a slightly curved shape. The mounting template for the opposite door of an automotive vehicle has a mirror-inverted curvature.

To be able to handle both types of mounting templates in the bonding system (which will be described further below) without changing the setting of the functional elements thereof, a lower section 7 of the mounting template 1 is made straight, namely such that the lateral end portions 8, 9 onto which a viscous adhesive is to be applied on precise spots are located along said straight line. As a result, each mounting template 1 with the intended bonding points 8, 9 is moved on the auxiliary door seals exactly below the metering devices of the bonding system without the need for adjusting the associated transportation means.

FIGS. 3 to 6 are various views of a bonding system 10 in which an auxiliary door seal 11 is prepared for the bonding operation. A mounting template 1 is fastened by way of a clamping means 12 to a horizontally movable slide 13, the connection valve 4 establishing the connection to a vacuum pump (not shown). When the auxiliary door seal 11 is now placed on the upper peripheral edge 2 of the mounting template 1, the auxiliary door seal 11 is fixed onto the mounting template.

The slide means 13 transports the mounting template 1 with the auxiliary door seal 11 at a predetermined speed below and past two plasma irradiation means 14 and below two metering devices 15. When the portions 8, 9 to which a very small amount of adhesive must be applied on precise spots are positioned below the valve outlet opening of the metering devices 15, the mounting 12 with the mounting template 1 is lifted by a lifting means, so that the auxiliary door seal 11 gets into contact with the exiting adhesive. The resulting adhesive thread is torn off by lowering the mounting template. Thereupon, the slide means 13 returns into the initial position in which the mounting template with the auxiliary door seal held by the vacuum is removed from the mounting 12.

The metering device 15 shown in more detail in FIG. 1 includes a cartridge 16 in which the viscous adhesive, e.g. a one-component adhesive, is positioned. The cartridge is engaged by a pneumatic piston 17 which can convey adhesive from the cartridge. The outlet from the cartridge 16 is connected via a bore 18 to the vertical bore 19 of a valve housing 20 in which a double-seat valve pin 21 is arranged. Said double-seat valve pin 21 has an upper conical section 22 which in the lifted state of the valve tightly rests on a correspondingly shaped valve seat, and a lower ball-shaped valve head 23 which in the lower position of the valve body closes the outlet opening 24 thereof.

Moreover, the metering device 15 comprises a displacement-type metering means designated by 25 on the whole, the displacement-type metering means including a pneumatic piston/cylinder means the displacement piston 26 of which is displacement-controlled. The retracted initial position of the displacement piston 26 is adjustable by means of an adjusting screw 27.

The outlet opening of the cylinder of the displacement-type metering means 25 communicates via a bore 28 with the portion of the valve bore 19 that is located between the frustoconical valve section 22 and the ball-shaped valve head 23.

When the moving mechanism of the valve pin 21 displaces the double-seat valve pin into the lower position, the outlet opening 24 of the metering means is closed and the interior of the cartridge 16 communicates via the bore 18, the vertical bore of the valve and the laterally branched-off bore 28 with the cylinder of the displacement-type metering means 25, so that due to the pressure exerted by the pneumatic piston 17 adhesive is pressed into the cylinder of the displacement-type metering means 25, the piston of said means being simultaneously retracted into the initial position. A seal 29 above the opening of the bore 18 into the vertical channel 19 of the valve, in which the valve seat 21 is seated, prevents the adhesive from exiting upwardly.

When the moving mechanism displaces the valve pin 21 upwards, so that the frustoconical valve section 22 tightly rests on its seat, the outlet opening 24 is released so that the predetermined amount of the viscous adhesive is exactly ejected by advancing the piston of the displacement-type metering means 25 up to a front stop.

What is claimed is:

1. A gluing system for door seals which are to be adhesively bonded to a door flange of an automotive vehicle, comprising:
    a seal mounting template having a peripheral edge,
    a plurality of spaced suction members on said peripheral edge for mounting a seal on said edge,
    a source of vacuum,
    a joint line and connection valve for connecting said suction members to said vacuum source,
    a relief valve on said line for relieving said suction members from said vacuum source,
    a receiving means for detachably holding said template,
    at least one plasma irradiation means,
    at least one adhesive metering means, and
    slide means for transporting said receiving means and said template past said plasma irradiation means for irradiating a seal on said template and for transporting said receiving means and said template past said metering means for applying adhesive to the irradiated seal.

2. A gluing system according to claim 1 including a plurality of pairs of plasma irradiation means and adhesive metering means for irradiating selected areas of a seal on said template and for applying adhesive to each of the irradiated areas.

3. A gluing system according to claim 1, characterized in that said metering device comprises a cartridge containing adhesive, said cartridge being connectable via a valve means to a displacement-type metering means, said valve means including an outlet opening and a double seat valve which releases either the connection between said cartridge and said displacement-type metering means or the connection between said displacement-type metering means and the outlet opening of said valve means.

4. The system according to claim 3, characterized in that a pneumatic piston engages into said cartridge.

5. The bending system according to claim 3, characterized in that said displacement-type metering means contains a pneumatic piston/cylinder means.

6. The system according to claim 3, characterized in that said valve means contains a reciprocating valve needle including a ball-shaped lower valve head and a conical section spaced therefrom and correspondingly shaped valve seats.

7. The system according to claim 5, characterized in that said pneumatic piston/cylinder means is displacement-controlled.

8. The system according to claim 4, characterized by means for monitoring the position of said piston and indicating a minimum fill level.

9. The system according to claim 4, characterized in that said valve means contains a reciprocating valve needle including a ball-shaped lower valve head and a conical section spaced therefrom and correspondingly shaped valve seats.

10. The system according to claim 5, characterized in that said valve means contains a reciprocating valve needle including a ball-shaped lower valve head and a conical section spaced therefrom and correspondingly shaped valve seats.

* * * * *